`3,084,189`
NICKEL COMPLEX OF GLUTAMINE DIHYDRATE AND METHOD FOR PURIFICATION OF GLUTAMINE
Robert W. H. Chang, St. Paul, Minn., assignor to General Mills, Inc., a corporation of Delaware
No Drawing. Filed Nov. 24, 1958, Ser. No. 775,735
3 Claims. (Cl. 260—534)

The present invention relates to a novel coordination compound of glutamine and nickel, and a method for purifying glutamine by the formation of this novel compound which is insoluble in non-alkaline solutions.

Glutamine as it appears naturally and also as it is synthetically produced is generally accompanied by various organic nitrogen containing compounds. Among these compounds are glutamic acid, glutamic acid methyl ester, gamma-glutamyl hydrazide, isoglutamine, pyrrolidone carboxylic acid, and various amino acids. Because of the similarity of physical and chemical properties of glutamine and the above-mentioned compounds, it is highly difficult to obtain a purified glutamine.

Known processes of purifying glutamine employ the crystallization and recrystallization of the glutamine from volatile solvents. Some of the disadvantages of such methods are the expense involved and the large amount of time consumed.

It is an object of the present invention to disclose a process by which a highly purified glutamine may be obtained from a solution containing glutamine and related compounds without crystallization from volatile solvents.

It is a further object of the present invention to disclose a novel crystalline nickel-glutamine coordination compound.

These and other objects of the instant invention will become more apparent upon a fuller understanding of the invention as hereinafter described.

Briefly stated, my invention is twofold: I have discovered a new compound which is the nickel complex of glutamine dihydrate, and furthermore I have discovered a method of purifying glutamine by forming this compound, which is unexpectedly water insoluble in non-alkaline solutions and, therefore, can be separated from the nickel complexes of the glutamine related compounds which are water soluble in non-alkaline solutions.

In the exercise of the present invention, the glutamine-containing mixture is dissolved in an alkaline solution containing nickel ions; the nickel complexes of glutamine and related compounds are formed; the solution is then neutralized, and diluted with water; the water-insoluble nickel complex of glutamine dihydrate is then separated and treated with hydrogen sulphide or other nickel precipitants, thereby yielding glutamine in a purified form.

The nickel ions may be supplied from various sources, such as a readily ionizable nickel salt, of which class nickel chloride is preferred. It is also possible to furnish sufficient nickel ions by using Raney nickel as the catalyst in the hydrogenolysis of the gamma-glutamyl hydrazide to glutamine. The only limitation on the amount of the source of nickel ions to be used is that it must furnish sufficient nickel ions to form the complexes of the available glutamine and related compounds. I find it preferable to use an amount of nickel ion source equivalent to at least one-half the crude glutamine being treated.

The presence of excess alkali in the crude glutamine-containing solution is necessary to form the alkaline-soluble nickel complexes. The alkali of choice in the practice of this present invention is ammonium hydroxide in a sufficient amount to render a pH of 8 to the glutamine solution. Larger amounts of ammonium hydroxide or other alkalis such as NaOH and KOH may be used, but offer no additional advantages.

While the nickel complex of glutamine dihydrate is insoluble in acidic as well as neutral aqueous solutions, I find it preferable to adjust the solution to a pH of 5 to 7 to insure maximum precipitation of the glutamine complex. This pH adjustment may be done with any water soluble acid, such as acetic, hydrochloric or phosphoric.

The following examples further illustrate the practice of the present invention:

*Example I*

Gamma-L-glutamyl hydrazine was heated with Raney nickel in water (20% solution) at 75–85° C. for 30–40 minutes with vigorous agitation and the spent Raney nickel was filtered off while the slurry was still hot. The filtrate was alkaline (about pH 9–10) because of the ammonia formaiton during hydrogenolysis. The filtrate was evaporated at 50° C. under reduced pressure to remove ammonia until solid precipitated. The slurry was then diluted with distilled water and filtered. The light blue filter cake was washed with water and finally washed with absolute methanol. The cake was then dried in a vacuum oven at 60° C. for 7 hours.

The material was analyzed and the structure was believed to be as follows:

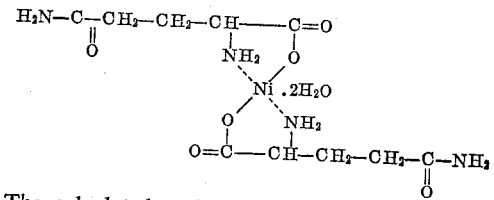

The calculated molecular weight based on the above structure is 385 and the analyses were:

|  | Theory | | Found | |
| --- | --- | --- | --- | --- |
|  | As is | Dry basis | As is | Dry basis |
| Percent H₂O* | 9.35 | | 10.0 | |
| Percent nitrogen | 14.55 | 16.06 | 14.51 | 16.12 |
| Percent nickel | 15.25 | 16.82 | 14.53 | 16.14 |

*Karl Fischer and Cenco Moisture balance.

*Example II*

Crude glutamine 36 grams (containing L-glutamic acid, L-glutamic acid methyl ester, glutamyl hydrazide, pyrrolidone carboxylic acid and an unidentified amino acid according to paper chromatography) and 18 grams of nickel chloride were added to 225 ml. water and the solution was adjusted to pH 8 with ammonium hydroxide. The dark blue solution was then adjusted to pH 7 with acetic acid. Upon standing overnight at room temperature, the nickel complex of L-glutamine dihydrate crystallized and was removed by filtration. The solid was washed with water and absolute methanol. The solid was slurried in water and H₂S gas was bubbled through the solution. The nickel sulfied was removed by filtration and the filtrate was chromatographed on paper. The chromatogram showed only two spots—one corresponding to L-glutamine and a very faint L-glutamic acid spot.

*Example III*

Deionized water (50 lbs.) in an enameled pot was heated with steam to about 70° C. and wet Raney nickel, 50% solids (20 lbs.) was added with vigorous agitation. Crude gamma-glutamyl hydrazine (11 lbs.) was slowly added to the aqueous slurry of Raney nickel; the temperature was maintained between 70–85° C. After all the material was added, the slurry was agitated for 40 minutes and the spent Raney nickel was removed by filtering. The filtrate, while still hot, was neutralized to a pH 7 with acetic acid and the blue solution was allowed to cool to room temperature overnight. The light blue nickel complex of glutamine was filtered under suction and the cake was washed with deionized water. The wet cake weighed 13.6 lbs. and contained 47% moisture. The yield was about 72%. A second crop of nickel complex of glutamine was obtainable by concentrating the filtrate.

It is to be understood that the present invention is intended to cover all changes and modifications of the examples of the invention herein chosen for the purpose of illustration, which do not constitute departure from the spirit and scope of the invention.

I claim:

1. A method for separating glutamine from a mixture containing glutamine and related compounds which comprises preparing an alkaline aqueous solution of said mixture and sufficient ionizable nickel to form complexes of the available glutamine and related compounds, adjusting the pH of said solution to a pH in the range of 5 to 7 thereby causing the precipitation of the nickel complex of glutamine dihydrate, separating the precipitated complex, mixing the separated complex with water, adding hydrogen sulfide thereby forming nickel sulfide and displacing free glutamine, separating the nickel sulfide and recovering the free glutamine from the aqueous phase.

2. The method of claim 1 wherein the ionizable nickel is provided by an ionizable nickel salt.

3. The process of claim 1 wherein the alkaline aqueous solution is the reaction mixture obtained by the hydrogenolysis of gamma-glutamyl hydrazine over a nickel catalyst.

References Cited in the file of this patent

UNITED STATES PATENTS

| | | |
|---|---|---|
| 2,645,653 | Zerweck et al. | July 14, 1953 |
| 2,680,758 | Thomas | June 8, 1954 |
| 2,788,370 | Rath | Apr. 9, 1957 |
| 2,846,470 | Joyce | Aug. 5, 1958 |

OTHER REFERENCES

Akabori et al.: Chemical Abstracts, vol. 48, page 12,796 (1954). (Copy in Sci. Library.)